(12) United States Patent
Mori et al.

(10) Patent No.: US 6,367,595 B1
(45) Date of Patent: Apr. 9, 2002

(54) DISK BRAKE WITH IMPROVED CALIPER

(75) Inventors: Koji Mori; Yoshiki Matsuzaki, both of Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/610,956

(22) Filed: Jul. 6, 2000

(30) Foreign Application Priority Data

Jul. 15, 1999 (JP) .......................................... 11-201408

(51) Int. Cl.[7] ......................... F16D 65/00; F16D 55/00
(52) U.S. Cl. .................... 188/73.1; 188/73.47; 188/72.4
(58) Field of Search ............................ 188/73.47, 71.7, 188/72.1, 72.4, 72.5, 73.1, 73.31

(56) References Cited

U.S. PATENT DOCUMENTS

| | | | |
|---|---|---|---|
| 4,494,630 A | * | 1/1985 | Stoka et al. ................ 188/71.8 |
| 5,150,772 A | * | 9/1992 | Pantale et al. .............. 188/72.4 |
| 5,558,183 A | * | 9/1996 | Way ........................... 188/71.6 |
| 5,660,251 A | * | 8/1997 | Nishizawa et al. ........ 188/73.35 |
| 5,687,818 A | * | 11/1997 | Nishizawa et al. ........ 188/73.35 |
| 5,860,494 A | * | 1/1999 | Nishizawa et al. ........ 188/73.35 |
| 6,000,506 A | * | 12/1999 | Warwick ..................... 188/73.31 |

FOREIGN PATENT DOCUMENTS

JP          11-63041        3/1999

\* cited by examiner

Primary Examiner—Christopher P. Schwartz
Assistant Examiner—Robert A. Siconolfi
(74) Attorney, Agent, or Firm—Greenblum & Bernstein, P.L.C.

(57) ABSTRACT

An opposed-piston type disk brake having a one-piece caliper having increased rigidity. The disk brake has a one-piece caliper having an inner portion formed with a first cylinder. The inner portion is fastened to a stationary part of the vehicle. The caliper further includes an outer portion formed with a second cylinder, and a bridge portion connecting the inner and outer portions together and having an annular inner surface defining a corner. The disk brake further includes pistons each received in one of the first and second cylinders, a disk rotor fastened to a wheel of the vehicle and disposed between the pistons, and friction pads disposed between the disk rotor and the pistons so as to be movable toward and away from the disk rotor. The caliper is formed with a recess having an arcuate cross-section having a predetermined radius of curvature in the inner surface of the outer portion along the corner to extend in a direction in which the pistons are moved so as not to protrude radially inwardly of the annular inner surface of the bridge portion.

6 Claims, 7 Drawing Sheets

FIG. 4A
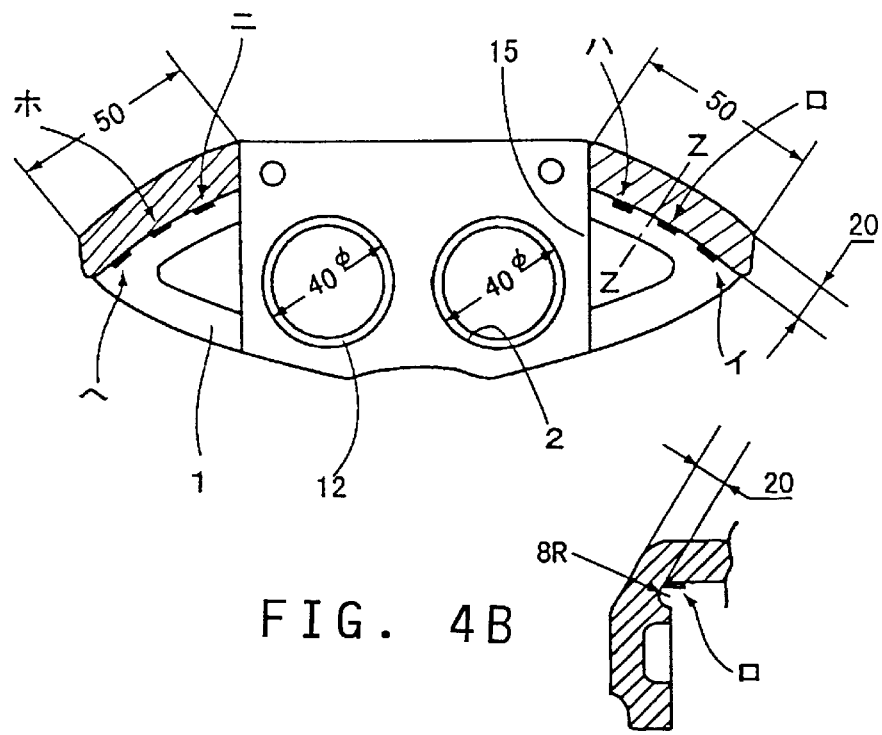
FIG. 4B
FIG. 5
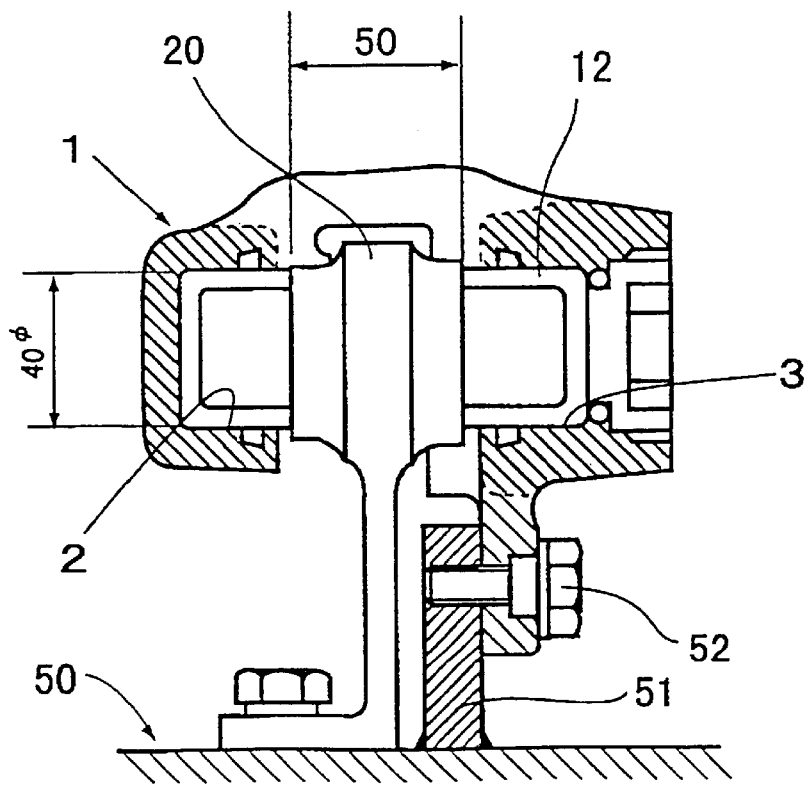

PRIOR ART

DISK BRAKE WITH IMPROVED CALIPER

BACKGROUND OF THE INVENTION

This invention relates to a disk brake for use in motor vehicles such as automobiles, and particularly of a type having a one-piece caliper with opposed pistons.

A typical conventional opposed-piston type disk brake has a caliper 50 comprising separate inner and outer portions 51 and 52 as shown in FIGS. 8 and 9. The inner and outer portions 51, 52 are secured together by bolts 54 with their flat surfaces 53 in close contact with each other. Each of the inner and outer portions 51, 52 are formed with a pair of close-bottomed cylinders 55. A piston 59 is received in each cylinder 55 with the gap between the piston and the cylinder liquid-tightly sealed by a piston seal 58. The caliper is formed with a groove 61 in which is received a disk rotor such that the rotor rotates with a predetermined clearance left between its outer perimeter and the inner wall of the caliper.

Friction pads 60 are disposed between the disk rotor and the pistons 59 on both sides while hanging from pad pins 66 inserted through pin holes 65 formed in the pads and secured to the caliper 50. When fluid pressure is applied from an external fluid supply source, the pistons 59 on both sides are moved toward each other to press the pads 60 against the rotor, thereby applying braking force to the wheel. The caliper 50 is formed with torque bearing surfaces 62 at both ends of the pads 60 to bear braking torque.

With this type of caliper, since the inner and outer portions are strongly joined together by the bolts 54, they are less likely to deflect at a portion near the groove 61 when the pads are pressed against the disk rotor for braking. But the bolts 54 necessarily increase the thickness of the bridge portion 110 of the caliper. This in turn reduces the radius R1 (FIG. 9) of the disk rotor and thus the effective braking radius R2, which is the radius of the circle that passes the centers of the pistons 59.

One way to increase the effective braking radius R2 without increasing the wheel inner radius R0 is to form the caliper as a one-piece member and thus to omit the bolts 54. But if the thickness of the bridge portion of such a one-piece caliper is reduced to increase the effective braking thickness R2, the outer portion of the caliper tends to bend outwardly due to stress concentration on the inner corner of the outer portion of the caliper, especially if the caliper is made of a aluminum alloy for reduced weight.

One possible solution to this problem would be to provide reinforcing ribs 118 as used in a floating-caliper type disk brake shown in FIG. 10. The ribs 118 are formed to extend across the inner corner X of the outer jaw 114. But actually, it would be impossible to use such ribs in a one-piece, opposed-piston type caliper because with this type of caliper the inner corners of the caliper are located much closer to the disk rotor than with the floating caliper because the opposed-piston type caliper needs torque bearing portions 62 (FIG. 8). Thus, if such ribs were provided along the inner corner of the outer portion of the caliper, they would interfere with the rotor.

An object of the invention is to provide an opposed-piston type disk brake having a one-piece caliper and provided with a means for preventing the outer portion of the caliper from bending outwardly during braking.

SUMMARY OF THE INVENTION

According to the present invention, there is provided a disk brake comprising a one-piece caliper comprising an inner portion formed with a first cylinder and fastened to a stationary part of a vehicle, an outer portion formed with a second cylinder, and a bridge portion connecting the inner and outer portions together and having an annular inner surface defining a corner, pistons each received in one of the first and second cylinders, a disk rotor fastened to a wheel of the vehicle and disposed between the pistons, and friction pads disposed between the disk rotor and the pistons so as to be movable toward and away from the disk rotor, characterised in that the caliper is formed with a recess having an arcuate cross-section having a predetermined radius of curvature in the inner surface of the outer portion along the corner to extend in a direction in which the pistons are moved so as not to protrude radially inwardly of the annular inner surface of the bridge portion.

Other features and objects of the present invention will become apparent from the following description made with reference to the accompanying drawings, in which:

BRIEF DESCRIPTION OF THE DRAWINGS

FIG. 4A is a sectional side view showing where strain gauges were mounted;

FIG. 4B is a sectional view taken along line Z—Z of FIG. 4A;

FIG. 5 is a sectional view showing how caliper test pieces were mounted on a test device for measuring stresses produced;

DETAILED DESCRIPTION OF THE PREFERRED EMBODIMENT

Figure 2:
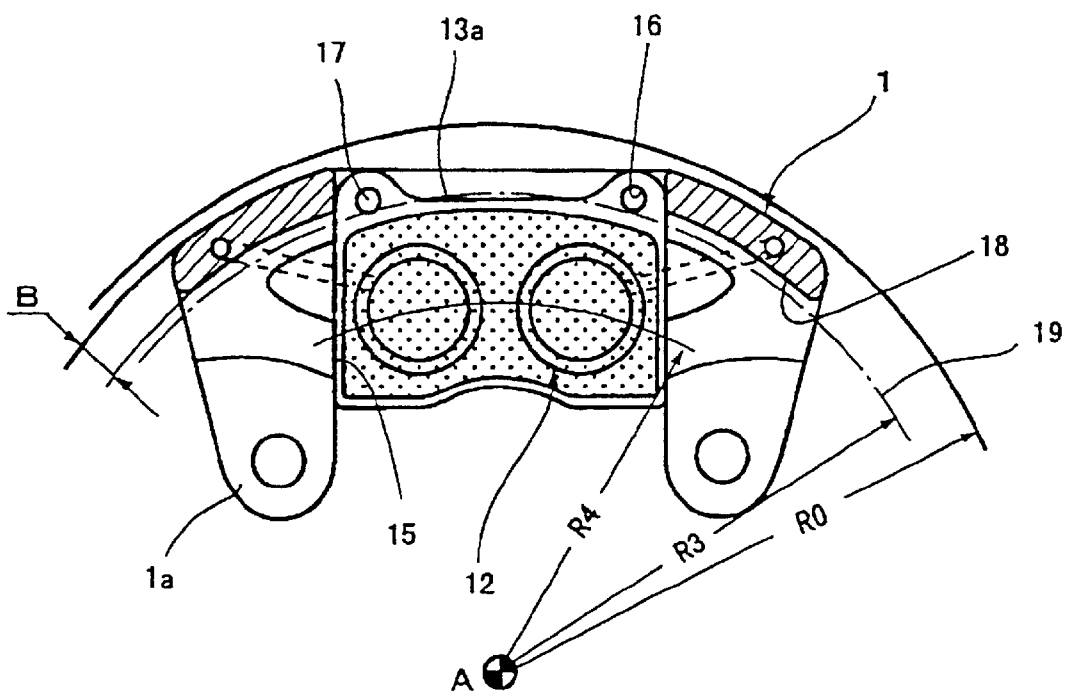
FIG. 2 is a sectional side view taken along a horizontal centerline (not shown) in FIG. 1.
Figure 3A:
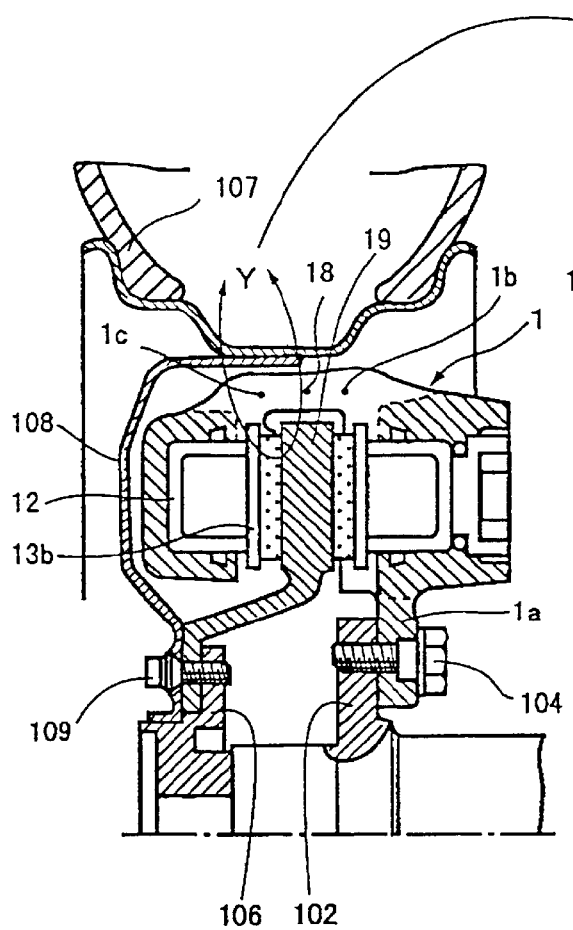
FIG. 3A is a vertical sectional view of the disk brake of FIG. 1 mounted in a tired wheel.
Figure 3B:
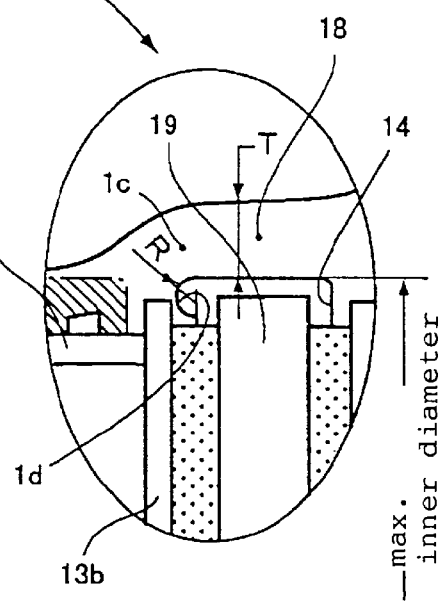
FIG. 3B is an enlarged sectional view of portion Y of FIG. 3A.

The disk brake according to the present invention includes an integral type caliper 1 comprising an inner portion, an outer portion and a bridge portion 18 connecting the inner and outer portions together. The inner portion of the caliper has two legs 1a (FIG. 2) secured to a flange 102 of an axle housing as a non-rotating portion of the vehicle by bolts 104 as shown in FIG. 3A. The caliper defines a groove 14 in which is received a disk rotor 19 such that the rotor having a radius R rotates with a predetermined clearance left between its outer perimeter and the inner wall of the bridge portion 18. The disk rotor 19 is secured to a hub flange 106 integral with the wheel axle, not shown, by bolts 109, together with a wheel 108 carrying a tire 107.

Figure 1:
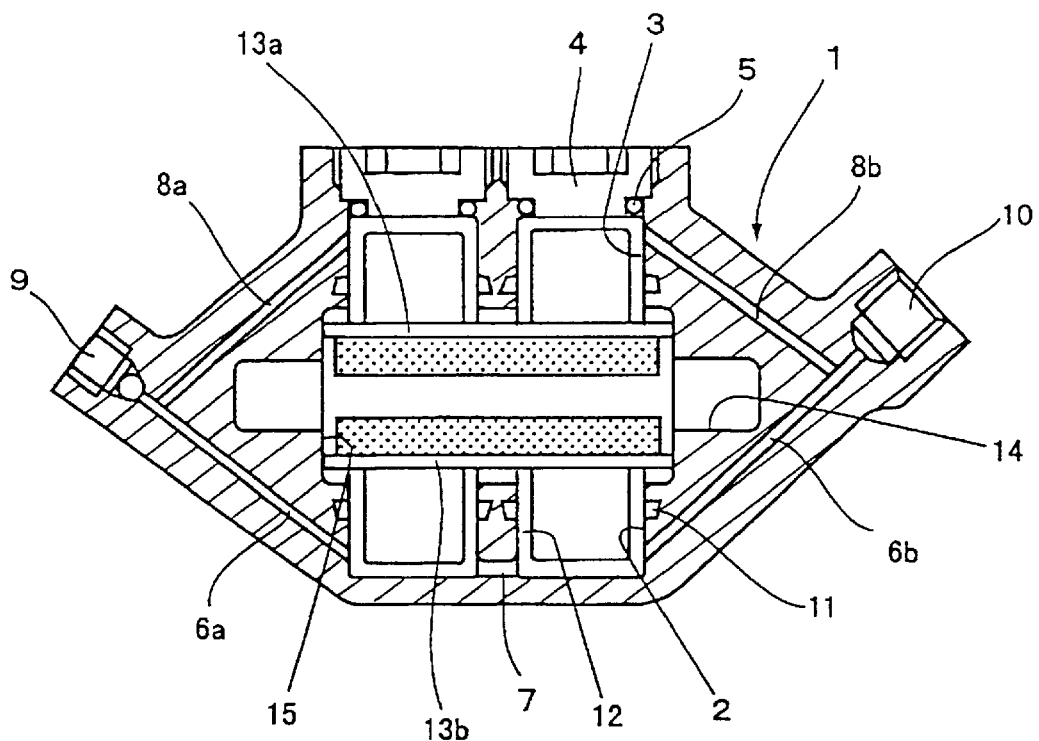
FIG. 1 is a sectional plan view of an opposed-piston type disk brake with a one-piece caliper embodying the invention.

The inner and outer portions of the caliper 1 are formed with cylinders 3 and 2, respectively (FIG. 1). The cylinders 3 are through holes having their rear ends closed by threading plugs 4 having hexagonal recesses with O-rings 5 disposed therebetween. The cylinders 2 are blind holes formed by a tool inserted through the cylinders 3 before they are closed by the plugs 4. At their rear ends, the cylinders 2 are connected together by a passage 7 formed when the caliper is formed by casting.

Obligue passages 6a and 6b extend from the backs of the respective cylinders 2 to openings at both ends of the caliper. Obligue passages 8a and 8b extend from the backs of the respective cylinders 3 to intermediate portions of the passages 6a and 6b, respectively, to connect the cylinders 3 with the cylinders 2. The passages 8a and 8b are formed by a drill inserted in the respective cylinders 3 before they are closed by the plugs 4. One of the openings is closed by a plug 9, and to the other opening 10 is connected an external fluid pressure source, not shown, to supply fluid pressure to pistons 12 received in the respective cylinders 2, 3 through the passages 6a, 6b, 8a, 8b and 7. Piston seals 11 seal fluid pressure.

Friction pads 13a, 13b are disposed between the disk rotor and the pistons on both sides while hanging from pad pins 17 inserted through pin holes 16 formed in the pads (FIG. 2) and secured to the caliper. When fluid pressure is applied from the fluid supply source, the pistons on both sides are moved toward each other to press the pads 13a, 13b against the rotor, thereby applying braking force to the disk rotor. The caliper is formed with torque bearing surfaces 15 at both ends of the pads to bear the braking torque.

Figure 8:
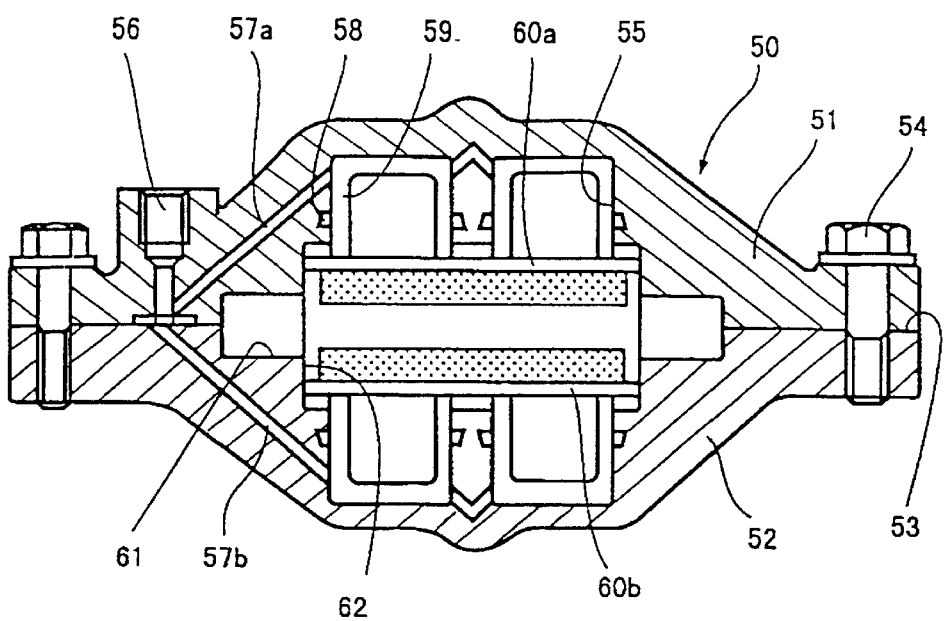
FIG. 8 is a sectional plan view of a conventional opposed-piston type disk brake having a caliper comprising separate portions coupled together by bolts.
Figure 9:
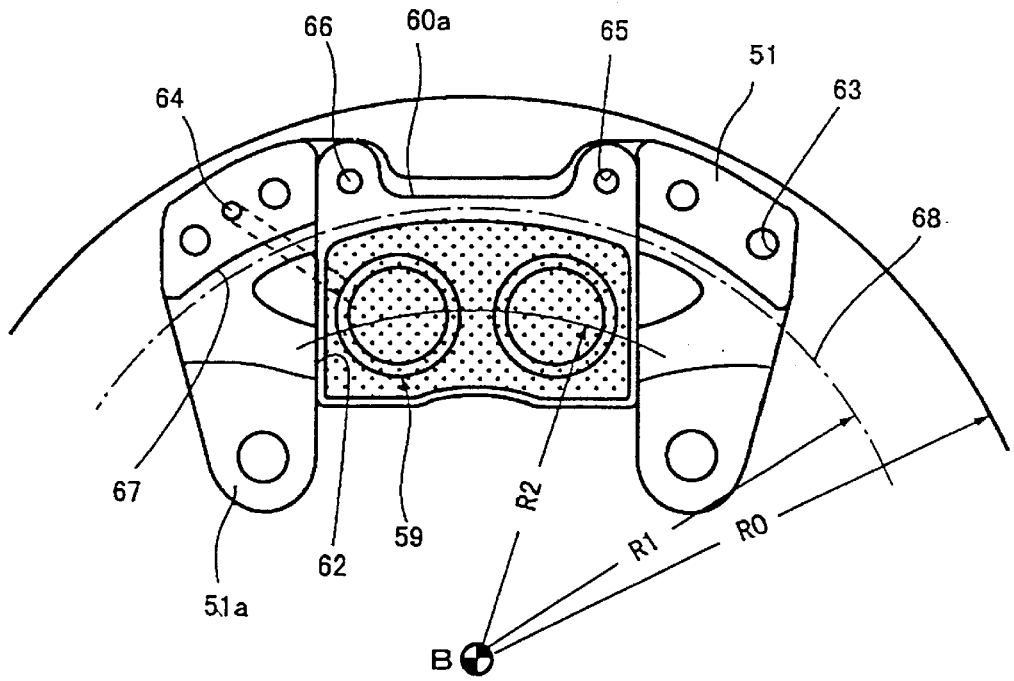
FIG. 9 is a side section of the same.
Figure 10:
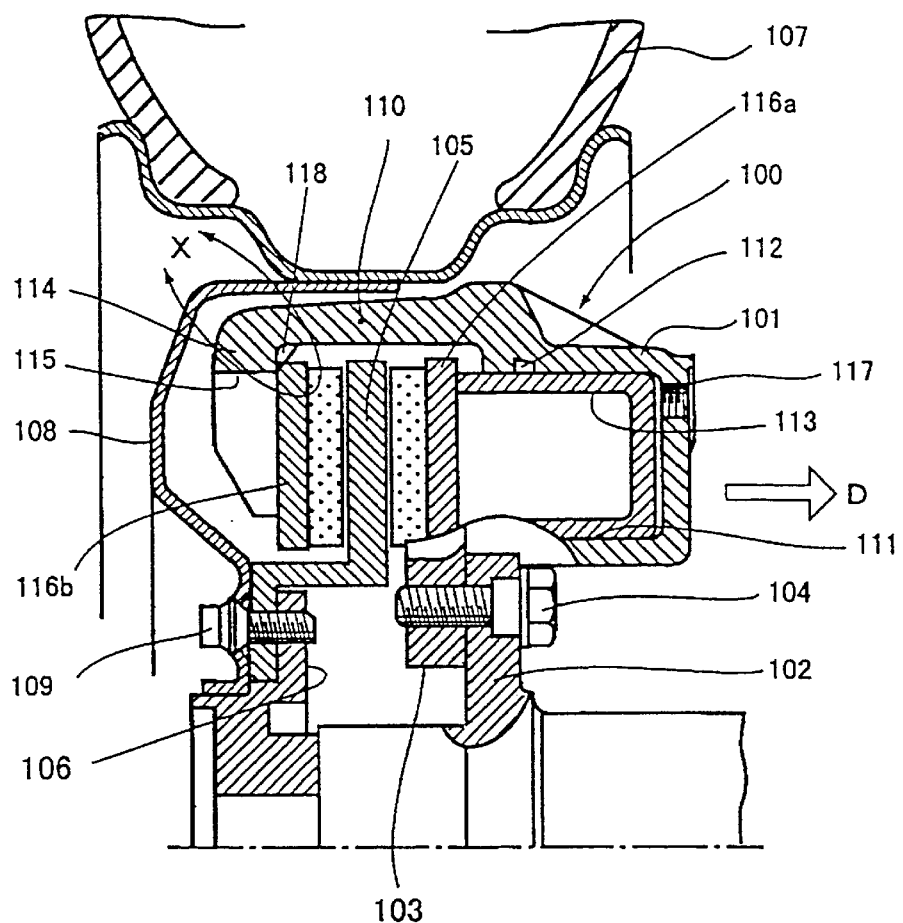
FIG. 10 is a sectional view showing how a conventional floating type disk brake is mounted in a tired wheel.
Figure 11:
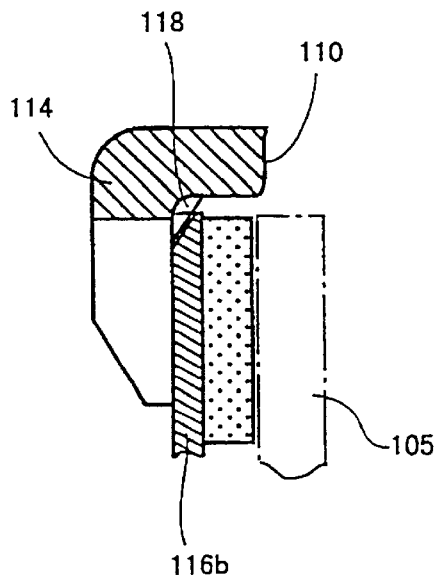
FIG. 11 is an enlarged sectional view showing how a rib is formed on the caliper of FIG. 10.
Figure 12:
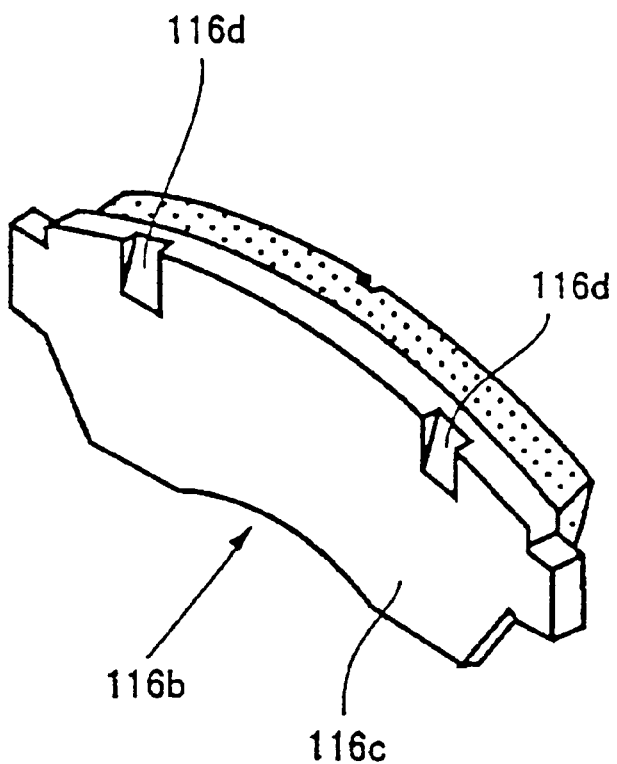
FIG. 12 is a perspective view of a friction pad of the conventional disk brake.

With this arrangement, since the caliper is a one-piece member, no bridge bolts 54 as shown in FIG. 8 are not necessary. Thus, compared with the separate-caliper type shown in FIGS. 8 and 9, it is possible to use a disk rotor having a greater radius than the disk rotor of FIG. 9 (R3>R1) while the wheel inner radius R0 is the same. This increases the effective braking radius (R4>R2), thus increasing the braking force within a limited wheel clearance.

Compared with the wheel clearance at a part 1b of the inner portion close to the disk rotor, the wheel clearance is extremely slight at a part 1c of the outer portion close to the disk rotor. Due to the necessity of reducing the thickness of the bridge portion 18 to provide a required wheel clearance, the rigidity of the bridge portion 18 tends to be the lowest at part 1c.

A recess 1d having an arcuate cross-section having a predetermined radius of curvature R is formed in the groove 14 in the inner surface of the outer portion of the caliper 1 along the inner corner between the inner portion and the bridge portion 18 of the caliper so as to extend in a direction in which the piston moves and not to protrude radially inwardly beyond the inner surface of the bridge portion 18.

The recess 1d should preferably be formed black (i.e., not machined) by casting because machining would form tool marks on the surface. The recess 1d prevents stress concentration on the inner corner between the outer portion and the bridge portion 18 of the caliper. This makes it possible to form the caliper from an aluminum alloy casting instead of steel casting and thus to reduce the weight of the caliper.

In order to determine the optimum range of the radius of curvature R of the recess 1d relative to the minimum thickness T of the bridge portion 18, stress produced near the recess 1d (at portion Y in FIG. 3A) when fluid pressure was applied was measured for calipers having an R value of 8 mm with the value T fixed at 20 mm in the following manner. That is, with strain gauges stuck on the inner surface of the bridge portion 18 at equal intervals as shown in FIG. 4, the caliper 1 was fixed to a flange 31 of a test bench 30 by bolts 32 shown in FIG. 5 with pistons 12 received in the cylinders 2, 3 and a mock-up disk rotor 20 and friction pads 13a, 13b sandwiched between the pistons, and with fluid pressure applied to the backs of the pistons from an external fluid pressure source. In this state, stress produced was measured by the strain gauges a to f. Dimensions of the calipers tested and other parts used in the test are shown in FIGS. 4 and 5.

The calipers tested were made of an aluminum alloy for casting known as [Type 4 CH], which is defined under JIS H 2211 and comprises 6.5–7.5 wt % Si, 0.20 wt % or less Ti, 0.15 wt % or less Fe, and Cu, Mg, Ni, etc. with the balance being Al.

Figure 6:
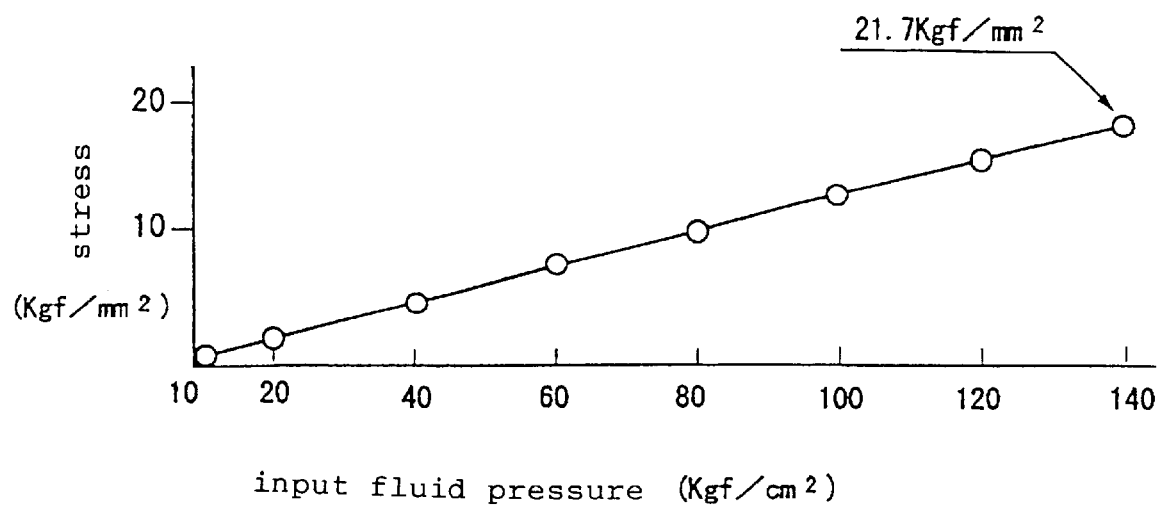
FIG. 6 is a graph with stresses plotted for the test piece according to the invention.

FIG. 6 shows the relationship between the average of the stresses measured by the gauges and the input fluid pressure for the caliper having a recess 1d having a radius of curvature R of 8 mm (which means that the R/T ratio is greater than 0.4). As shown in FIG. 6, up to the input pressure of 140 kgf/cm$^2$, the stress increases substantially linearly, and the stress at input pressure 140 kgf/cm$^2$ is still only 21.7 kgf/mm$^2$, which is well within 80% of the maximum allowable stress of [Type 4 CH].

Then the stress near the portion Y was measured with different R valves and the thickness T of the bridge portion fixed at 20 mm in the same manner as mentioned above.

Figure 7:
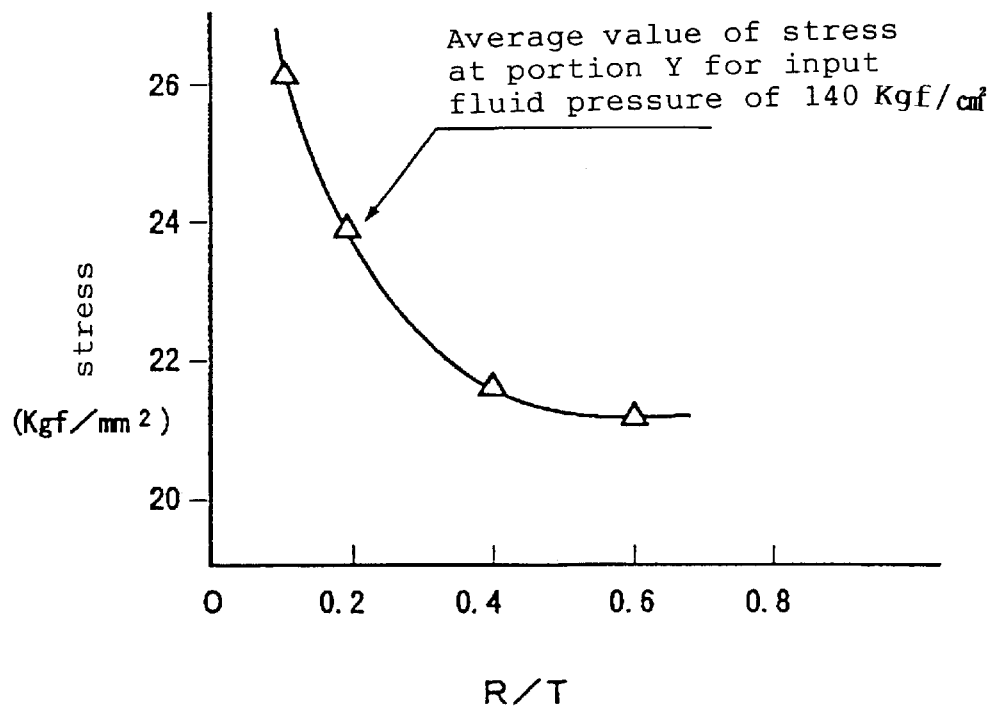
FIG. 7 is a graph showing the relationship between the stress produced and the ratio of the radius of curvature R of the recess to the thickness T of the bridge portion.

FIG. 7 shows the relationship between the average of the stresses measured by the gauges and the R/T ratio when the input fluid pressure was 140 kgf/cm$^2$. The graph clearly shows that the stress increases sharply as the R/T ratio decreases below 0.4. This shows that in order to prevent deflection of the bridge portion 18 near its groove 14, the R/T ratio should be equal to or greater than 0.4.

With the provision of such a recess, it is possible to suppress any deflection of the bridge portion at a portion near the rotor groove with a large braking radius. This is particularly advantageous in substituting aluminum alloy casting for steel casting for reduced caliper weight.

We claim:

1. A brake comprising a one-piece caliper comprising an inner portion formed with a first cylinder and fastened to a stationary part of a vehicle, an outer portion formed with a second cylinder, and a bridge portion connecting said inner and outer portions, said bridge portion having, in its radially inner surface, an arcuate groove having a cross-section defining an outer corner adjacent said outer portion and an inner corner adjacent said inner portion, a piston received in each of said first and second cylinders, a disk rotor attachable to a wheel of the vehicle and positioned between said pistons with a radially outer peripheral portion of said disk rotor received in said groove, friction pads disposed between said disk rotor and said pistons so as to be movable toward and away from said disk rotor, said disk rotor being opposite to said inner and outer corners, said bridge portion comprising bridge sections provided at both sides of the friction pads in a circumferential direction of the disk rotor, said groove being provided in said bridge sections, said groove with a recess having an arcuate cross-section having a predetermined radius of curvature, said recess being provided at said outer corner of said groove to extend in a direction in which said pistons are moved so as not to protrude radially inwardly beyond inner surfaces of said bridge sections.

2. The disk brake as claimed in claim 1, wherein said recess has a cast surface.

3. The disk brake as claimed in claim 1, wherein the ratio of said radius of curvature to the minimum thickness of said bridge portion is equal to or greater than 0.4.

4. The disk brake as claimed in claim 1, wherein said caliper comprises a cast aluminum alloy.

5. The brake according to claim 1, the inner corner having a shape different than said outer corner having said recess.

6. The brake according to claim 1, said groove extending from a circumferential position of said friction pads in leading and trailing sections of said bridge portion with respect to the circumferential direction of rotation of the disk rotor, and having a width, in an axial direction of the disk rotor, sufficient to receive the disk rotor.

* * * * *